US006901959B2

(12) United States Patent
Burrola et al.

(10) Patent No.: US 6,901,959 B2
(45) Date of Patent: Jun. 7, 2005

(54) THREE PORT SOLENOID VALVE

(75) Inventors: Santos Burrola, Chihuahua (MX); Alejandro Moreno, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/654,754

(22) Filed: Sep. 4, 2003

(65) Prior Publication Data
US 2005/0051222 A1 Mar. 10, 2005

(51) Int. Cl.[7] ............................................. F15B 13/044
(52) U.S. Cl. ........................ 137/625.65; 137/625.27; 251/129.08
(58) Field of Search .................. 137/625.27, 625.65; 251/129.08

(56) References Cited

U.S. PATENT DOCUMENTS

| | | | | |
|---|---|---|---|---|
| 2,930,404 A | * | 3/1960 | Kowaski et al. | 137/625.65 |
| 4,711,265 A | * | 12/1987 | Davis et al. | 137/625.65 |
| 4,844,122 A | * | 7/1989 | Ichihashi | 137/625.65 |
| 5,083,747 A | * | 1/1992 | Schmitt-Matzen | 137/625.65 |
| 6,578,933 B2 | | 6/2003 | Hageman et al. | |
| 6,619,615 B1 | * | 9/2003 | Mayr et al. | 251/129.08 |
| 2004/0134547 A1 | * | 7/2004 | Moreno et al. | 137/625.65 |

* cited by examiner

Primary Examiner—Gerald A. Michalsky
(74) Attorney, Agent, or Firm—Jimmy L. Funke

(57) ABSTRACT

A solenoid valve includes a housing that establishes a supply port, a control port, and an exhaust port. A fluted bushing is statically affixed within the housing and a poppet slides within the bushing. The poppet is movable between a de-energized configuration wherein flow is prohibited between the control port and the exhaust port, and permitted between the control port and the supply port, plural partially energized configurations wherein flow is permitted between the supply port and the control port, between the control port and the exhaust port, and between the exhaust port and the supply port, and a fully energized configuration wherein flow is prohibited between the control port and the supply port and flow is permitted between the control port and the exhaust port.

19 Claims, 2 Drawing Sheets

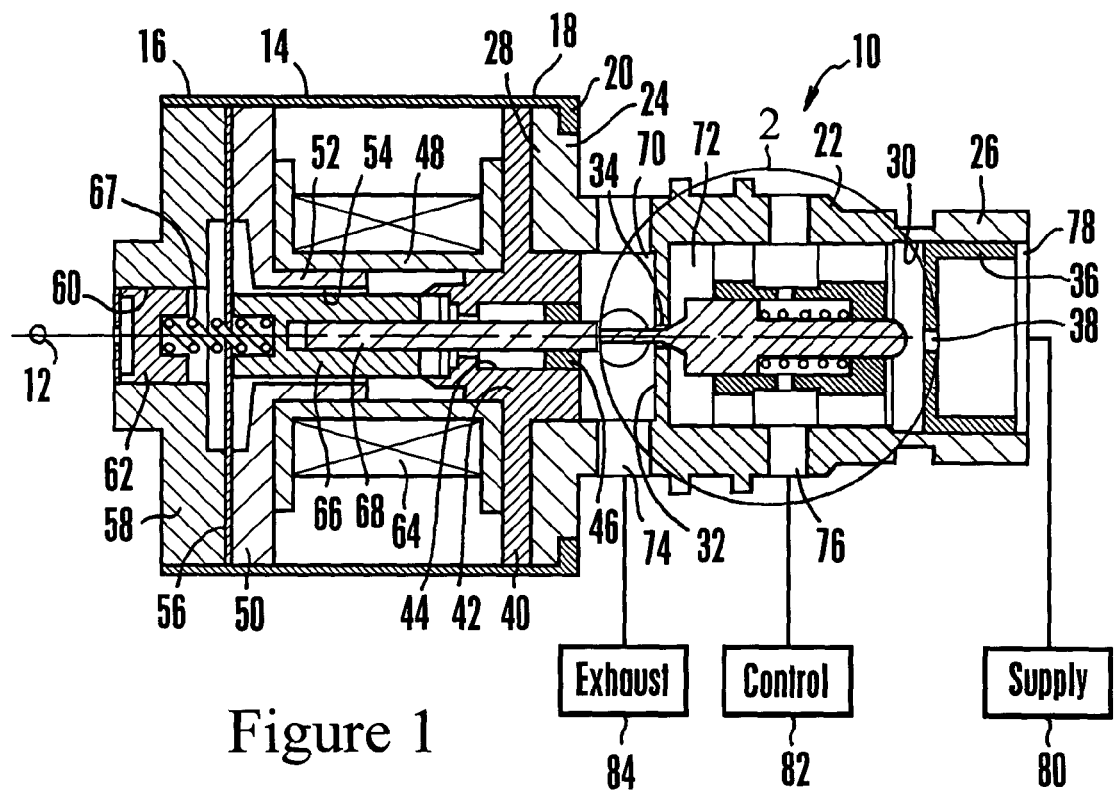
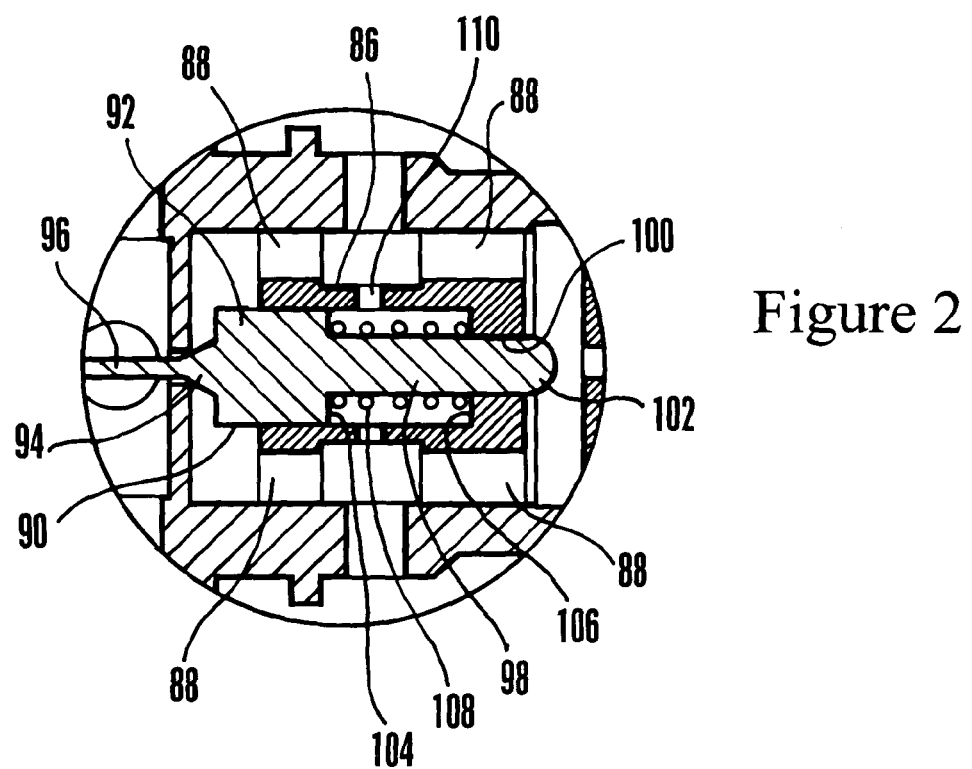
Figure 1
Figure 2

US 6,901,959 B2

THREE PORT SOLENOID VALVE

TECHNICAL FIELD

The present invention relates generally to hydraulic solenoid valves.

BACKGROUND OF THE INVENTION

A typical automobile includes numerous systems that use one or more solenoid valves to control the flow of fluid within the system and to control the flow of fluid to and from the system. Many of these solenoid valves are three port solenoid valves that require hydraulic fluid to be isolated or modulated between a supply, control, and exhaust port. In order to properly isolate or modulate the flow of the hydraulic fluid, the geometry around a supply-to-control (S/C) valve seat and the geometry around a control-to-exhaust (C/E) valve seat must be customized as a function of the poppet travel. In most cases, especially linear pressure control solenoid valves, poppet alignment and/or the presence of a spring in the hydraulic flow path can result in significant variation in the functional performance of the solenoid valve.

A typical three port solenoid valve uses a rod and ball configuration to control the flow of fluid between the ports. The rod can have an area that interfaces with one seat and a portion that extends to push a ball away from a second seat. Moreover, the ball has a spring behind it that helps keep it seated or in contact with the rod. This type of configuration produces two annular orifices with a radially floating ball that is sensitive to component alignment. Since the spring is typically within the flow path, it can significantly restrict the flow of hydraulic fluid within the solenoid valve.

The present invention has recognized these prior art drawbacks, and has provided the below-disclosed solutions to one or more of the prior art deficiencies.

SUMMARY OF THE INVENTION

A solenoid valve includes a housing in which a preferably "I"-shaped bushing is statically disposed. A flute is formed by the bushing and the flute establishes a fluid flow path through the solenoid valve and connects the control and exhaust ports. Moreover, a poppet is slidably disposed within the bushing.

In a preferred embodiment, the poppet includes an enlarged base that has an outer diameter that is slightly smaller than an inner diameter of the bushing. Preferably, the poppet also includes a proximal end that extends from the enlarged base. A first poppet rod extends from the proximal end and a second poppet rod extends from the enlarged base opposite the proximal end. Further, a distal end is established by the second poppet rod opposite the proximal end.

Preferably, a coil spring is disposed within the bushing around the second poppet rod formed by the poppet. In a preferred embodiment, the housing forms a supply port, a control port, and an exhaust port. The poppet is movable between a de-energized configuration, a partially energized configuration, and a fully energized configuration. In the de-energized configuration, flow is prohibited between the control port and the exhaust port, and permitted between the control port and the supply port. In the partially energized configuration, flow is permitted between the supply port and the control port, between the control port and the exhaust port, and between the exhaust port and the supply port. Moreover, in a fully energized configuration flow is prohibited between the control port and the supply port and flow is permitted between the control port and the exhaust port.

In another aspect of the present invention, a solenoid valve includes a housing that establishes a supply port, a control port, and an exhaust port. In this aspect, a bushing is statically disposed within the housing and a poppet is slidably disposed within the bushing. The poppet is movable between a de-energized configuration, a partially energized configuration, and a fully energized configuration. In the de-energized configuration, flow is prohibited between the control port and the exhaust port, and is permitted between the control port and the supply port. In the partially energized configuration, flow is permitted between the supply port and the control port, between the control port and the exhaust port, and between the exhaust port and the supply port. Additionally, in the fully energized configuration, flow is prohibited between the control port and the supply port and flow is permitted between the control port and the exhaust port.

In yet another aspect of the present invention, a fluid control system includes a fluid supply, a hydraulically controlled device, a fluid exhaust, and a solenoid valve that is in fluid communication with the fluid supply, the hydraulically controlled device, and the fluid exhaust. In this aspect, the solenoid valve includes a bushing that is statically disposed therein and a poppet that is slidably disposed within the bushing.

BRIEF DESCRIPTION OF THE DRAWINGS

The present invention will now be described, by way of example, with reference to the accompanying drawings, in which:

FIG. 1 is a cross-section view of a three port solenoid valve in a de-energized configuration;

FIG. 2 is a detailed cross-section view of the three port solenoid valve taken at circle 2 in FIG. 1;

DESCRIPTION OF THE PREFERRED EMBODIMENT

Figure 3:
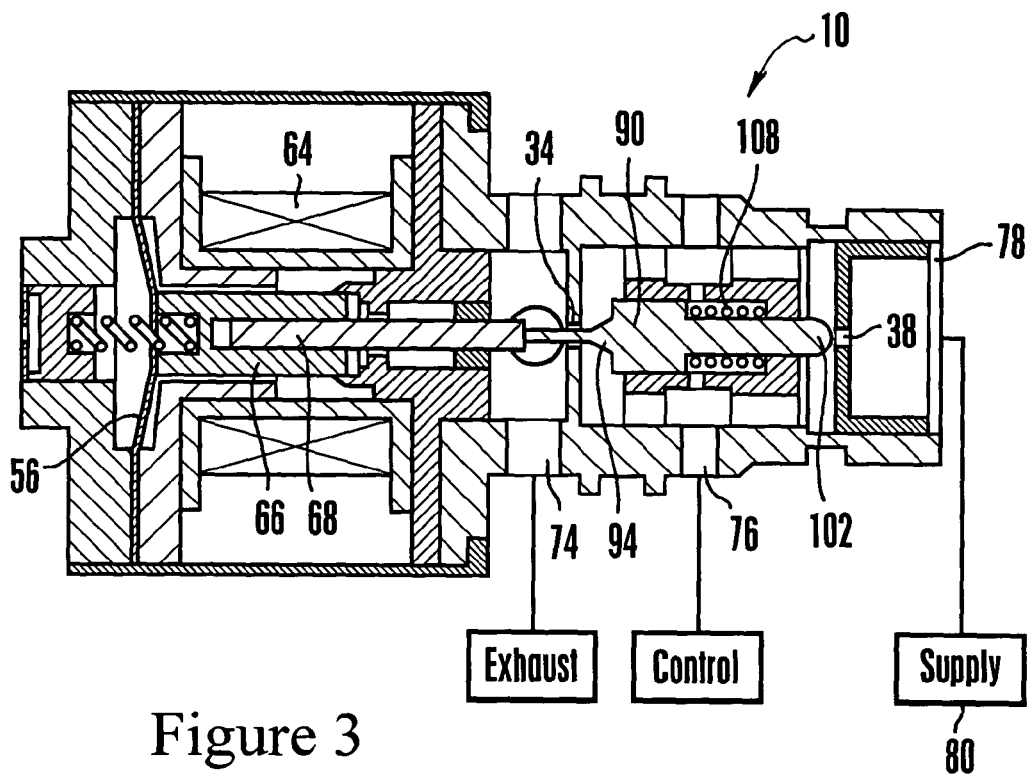
FIG. 3 is a cross-section view of the solenoid valve in a partially energized configuration.

Referring initially to FIG. 1, a three port solenoid valve is shown and is generally designated 10. As shown, the solenoid valve 10 defines a longitudinal axis 12 and preferably includes a hollow, generally cylindrical frame 14 that defines an open proximal end 16 and an open distal end 18 that is circumscribed by an internal lip 20. FIG. 1 shows that the preferred solenoid valve 10 also includes a housing 22 that defines a proximal end 24 and a distal end 26. The proximal end 24 of the housing 22 can be circumscribed by a flange 28 that has an external diameter approximately equal to the internal diameter of the frame 14. The housing 22 can be disposed within the frame 14 such that the distal end 26 of the housing 22 protrudes through and extends beyond the distal end 18 of the frame 14. Also, the flange 28 of the housing 22 can abut the internal lip 20 of the frame 14.

Moreover, FIG. 1 shows that a generally cylindrical bore 30 can be formed through the housing 22 along the longitudinal axis 12. A generally disk-shaped internal wall 32 is established within the housing 22, i.e., within the bore 30, approximately one-third the length of the housing 22 away from the proximal end 24 of the housing 22. As shown in FIG. 1, a control-to-exhaust (C/E) valve seat 34 can be established in the center of the internal wall 32. FIG. 1 further shows a valve fitting 36 disposed in the distal end 26 of the housing 22. In a preferred embodiment, a supply-to-control (S/C) valve seat 38 is established in the center of the valve fitting 36.

As further shown in FIG. 1, a primary plate 40 can be disposed within the frame 14 adjacent to the housing 22. The primary plate 40 includes a central hub 42 that extends into the housing 22 and into the frame 14. The central hub 42 is further formed with a central bore 44 and a generally cylindrical, hollow bushing 46 is disposed therein. FIG. 1 also shows a generally I-shaped, hollow bobbin 48 that is disposed within the frame 14 adjacent to the primary plate 40. Preferably, a portion of the central hub 42 extends into the bobbin 48. Further, a secondary plate 50 is installed in the proximal end 16 of the frame 14 adjacent to the bobbin 48 such that the bobbin 48 is sandwiched between the primary plate 40 and the secondary plate 50. In a preferred embodiment, the secondary plate 50 includes a central hub 52 that extends at least partially into the bobbin 48. Moreover, the central hub 52 of the secondary plate 50 is formed with a central bore 54.

FIG. 1 further shows a diaphragm spring 56 adjacent to the secondary plate 50. A sandwich plate 58 is installed in the frame 14 adjacent to the diaphragm spring 56 which is sandwiched between the secondary plate 50 and the sandwich plate 58. As shown, the sandwich plate 58 is formed with a central bore 60. An adjuster 62, e.g., a screw, is installed within the central bore 60 of the sandwich plate 58 and can be threadably engaged with the sandwich plate 58.

As shown in FIG. 1, a coil 64 is wound or otherwise formed around the bobbin 48. Additionally, a plunger 66 is slidably disposed within the central hub 52 of the secondary plate 50. The plunger 66 is attached to the diaphragm spring 56 and a helical, coil-shaped spring 67 is installed in compression between the adjuster 62 and the plunger 66. Preferably, a plunger rod 68 extends from the plunger 66 through the length of the bobbin 48 and through the primary plate 40. As shown, the plunger rod 68 is supported by the bushing 46 within the primary plate 40. In a preferred embodiment, the plunger rod 68 maintains contact with the poppet, described below.

In a preferred embodiment, a first fluid chamber 70 is established within the housing bore 30 between the primary plate 40 and the internal wall 32. Additionally, a second fluid chamber 72 is established between the internal wall 32 and the valve fitting 36. An exhaust port 74 is formed in the housing 22 near the proximal end 24 of the housing 22 and extends into the first fluid chamber 70. Preferably, a control port 76 can extend through the housing 22 into the second fluid chamber 72. FIG. 1 further shows that a supply port 78 can be formed in the distal end 26 end of the housing 22.

As shown in FIG. 1, a fluid supply 80, e.g., a pump, can be connected to the supply port 78. Moreover, a hydraulically controlled device 82, e.g., a brake cylinder or spool valve, can be connected to the control port 76. A fluid exhaust 84, e.g., a reservoir, can be connected to the exhaust port 74.

Referring now to the detailed view provided by FIG. 2, it is shown that in a preferred embodiment, a generally "I"-shaped, hollow bushing 86 is disposed within the housing bore 30, specifically within the second fluid chamber 72 established therein. The bushing 86 is fixed with respect to the housing 22. Preferably, the bushing 86 is formed with plural flutes 88 to establish a fluid flow path through the second fluid chamber 72. As shown in FIG. 2, a poppet 90 can be slidably disposed within the "I"-shaped bushing 86.

Preferably, the poppet 90 is formed with an enlarged base 92 having a diameter slightly smaller than the internal diameter of the "I"-shaped bushing 86. A frusto-conical proximal end 94 extends from the enlarged base 92 toward the C/E valve seat 34. The frusto-conical proximal end 94 is sized and shaped to block the C/E valve seat 34 when the solenoid valve is in the de-energized configuration, shown in FIG. 1. Moreover, as shown in FIG. 2, a first poppet rod 96 extends from the frusto-conical proximal end 94 of the poppet 90 and abuts the plunger rod 68.

FIG. 2 further shows that a second poppet rod 98 extends from the enlarged base 92 opposite the frusto-conical proximal end 94 thereof. The second poppet rod 98 extends through a bore 100 formed in the "I"-shaped bushing 86 toward the S/C valve seat 38. As shown, the second poppet rod 98 can terminate in a rounded distal end 102 that is sized and shaped to block the S/C valve seat 38 when the solenoid valve 10 is fully energized as described in detail below. Accordingly, the poppet 90 has a dual-sealing face, i.e., the frusto-conical proximal end 94 and the rounded distal end 102, and is decoupled from the plunger 66. It can be appreciated that the frusto-conical proximal end 94 of the poppet 90 can be rounded, e.g., like the distal end 102 of the poppet 90. Conversely, the rounded distal end 102 of the poppet 90 can be frusto-conical, e.g., like the proximal end 94 of the poppet 90.

In a preferred embodiment, a first spring contact face 104 is established radially around the poppet 90 at the transition between the enlarged base 92 and the second poppet rod 98. Further, a second spring contact face 106 is established within the "I"-shaped bushing 86 such that it circumscribes the bore 100 established therein. Preferably, a helical, coil-shaped spring 108 is installed in compression around the poppet 90, within the bushing 86, between the first spring contact face 104 and the second spring contact face 106. As shown, the spring 108 is located entirely within the confines of the "I"-shaped bushing 86 and cannot restrict the flow of fluid through the second fluid chamber 72. In a preferred embodiment, plural vent holes 110 are radially formed in the bushing 86 in order to equalize the control pressure on the poppet 98.

Operation

Initially, when the coil 64 is de-energized, as shown in FIG. 1, the solenoid valve 10 is in a de-energized configuration, the frusto-conical proximal end 94 of the poppet 90 is seated against the C/E valve seat 34 to block flow between the control port 76 and the exhaust port 74. In the de-energized configuration, the rounded distal end 102 of the poppet 90 is distanced a maximum distance from the S/C valve seat 38 to allow fluid flow between the control port 76 and the supply port 78.

When the solenoid valve 10 is in a partially energized configuration, shown in FIG. 3, the coil 64 is partially energized and the plunger 66 moves to the right, looking down at FIG. 3, and deflects the diaphragm spring 56. The plunger 66 forces the poppet 90 to also move to the right, which compresses the coil spring 108. As the plunger 66 moves, the poppet 90 moves toward the S/C valve seat 38 and the frusto-conical proximal end 94 is unseated from the C/E valve seat 34. In the partially energized configuration, fluid flow is permitted between the supply port 78, the control port 76, and the exhaust port 74.

Figure 4:
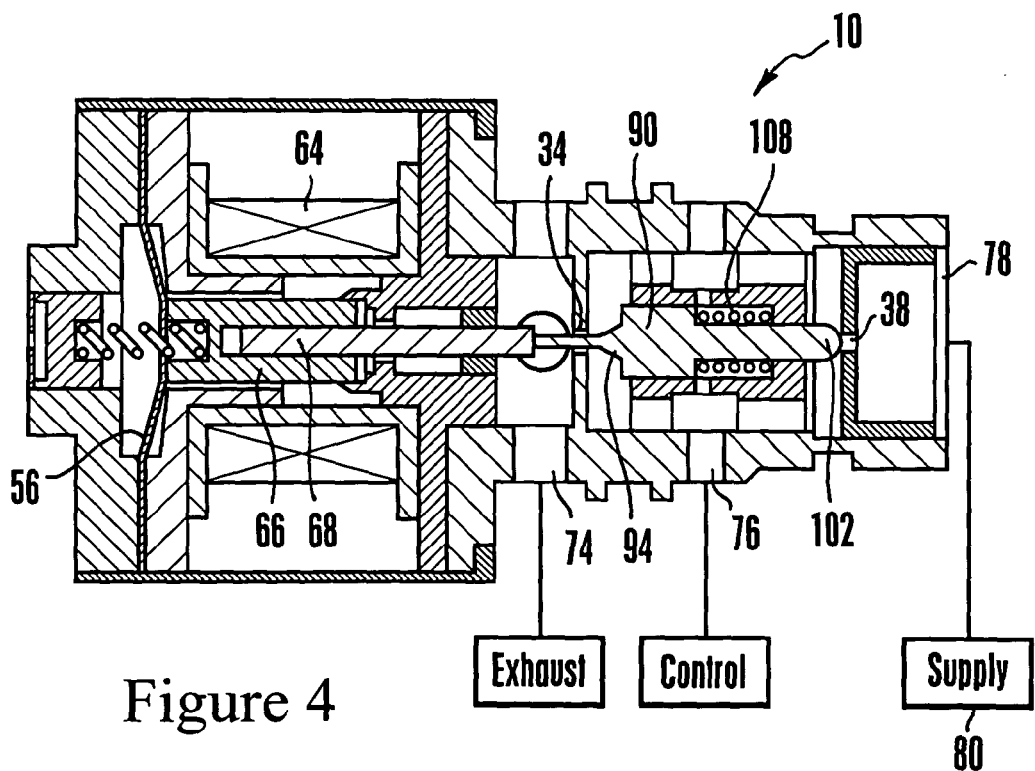
FIG. 4 is a cross-section view of the solenoid valve in a fully energized configuration.

When the solenoid valve 10 is in the fully energized configuration, shown in FIG. 4, the current applied to the coil 64 has reached a predetermined upper threshold. In this configuration, the plunger 66 reaches its maximum displacement, as shown in FIG. 4, wherein the rounded distal end 102 of the poppet 90 engages the S/C valve seat 38 to block fluid flow between the supply port 78 and the control port 76 and between the supply port 78 and the exhaust port 74. In this configuration, fluid flow between the control port 76 and the exhaust port 74 is permitted.

As the current applied to the solenoid valve 10 decreases, the coil spring 108 moves the poppet 80 to the left, looking at FIGS. 1, 3, and 4. The diaphragm spring 56 also moves the plunger 66 to the left. When the solenoid valve 10 is de-energized, the solenoid valve returns to the configuration shown in FIG. 1.

With the configuration of structure described above, the solenoid valve 10 includes a spring 108 that is fully enclosed within the bushing. Since the spring 108 is not within the flow path through the second fluid chamber 72, it does not restrict the flow of hydraulic fluid through the solenoid valve. Moreover, the ratio of the poppet length to the poppet diameter can be maximized which, in turn, minimizes leakage, component wear, and flow control performance variation, due to misalignment of the poppet 90 with respect to the valve seats 34, 38.

While the particular THREE PORT SOLENOID VALVE as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A solenoid valve, comprising:
   a housing;
   a bushing statically disposed within the housing;
   at least one flute established by the bushing, the flute extending the axial length of the bushing and establishing a fluid flow path through the solenoid valve; and
   a poppet slidably disposed within the bushing.

2. The valve of claim 1, wherein the bushing is formed with at least one radially formed vent hole.

3. The valve of claim 1, wherein the poppet comprises:
   an enlarged base, the enlarged base having an outer diameter slightly smaller than an inner diameter of the bushing.

4. The valve of claim 3, wherein the poppet further comprises:
   a proximal end extending from the enlarged base;
   a first poppet rod extending from the proximal end;
   a second poppet rod extending from the enlarged base opposite the proximal end; and
   a distal end established by the second poppet rod opposite the proximal end.

5. The valve of claim 4, further comprising:
   a coil spring around the second poppet rod within the bushing.

6. The valve of claim 1, wherein the housing forms a supply port, a control port, and an exhaust port, the poppet being movable to block flow through one or more of the ports.

7. The valve of claim 6, wherein the poppet is movable between a de-energized configuration wherein flow is prohibited between the control port and the exhaust port, and permitted between the control port and the supply port, plural partially energized configurations wherein flow is permitted between the supply port and the control port, between the control port and the exhaust port, and between the exhaust port and the supply port, and a fully energized configuration wherein flow is prohibited between the control port and the supply port and flow is permitted between the control port and the exhaust port.

8. A solenoid valve, comprising:
   a housing;
   a supply port established by the housing;
   a control port established by the housing;
   an exhaust port established by the housing;
   a bushing statically disposed within the housing, the bushing having at least one flute extending the axial length thereof;
   a poppet slidably disposed within the bushing; and
   wherein the poppet is movable between a de-energized configuration wherein flow is prohibited between the control port and the exhaust port, and permitted between the control port and the supply port, plural partially energized configurations wherein flow is permitted between the supply port and the control port, between the control port and the exhaust port, and between the exhaust port and the supply port, and a fully energized configuration wherein flow is prohibited between the control port and the supply port and flow is permitted between the control port and the exhaust port.

9. The valve of claim 8, wherein the bushing is formed with at least one radially formed vent hole.

10. The valve of claim 8, wherein the poppet comprises:
    an enlarged base, the enlarged base having an outer diameter slightly smaller than an inner diameter of the bushing.

11. The valve of claim 10, wherein the poppet further comprises:
    a proximal end extending from the enlarged base;
    a first poppet rod extending from the proximal end;
    a second poppet rod extending from the enlarged base opposite the proximal end; and
    a distal end established by the second poppet rod opposite the proximal end.

12. The valve of claim 11, further comprising:
    a coil spring around the second poppet rod within the bushing.

13. A fluid control system, comprising:
    a fluid supply;
    a hydraulically controlled device;
    a fluid exhaust; and
    a solenoid valve in fluid communication with the fluid supply, the hydraulically controlled device, and the fluid exhaust, the solenoid valve including a bushing statically disposed therein, the bushing having at least one flute extending the axial length thereof, and a poppet slidably disposed within the bushing.

14. The system of claim 13, wherein the bushing is formed with at least one radially formed vent hole.

15. The system of claim 13, wherein the poppet comprises:
an enlarged base, the enlarged base having an outer diameter slightly smaller than an inner diameter of the bushing.

16. The system of claim 15, wherein the poppet further comprises:
a proximal end extending from the enlarged base;
a first poppet rod extending from the proximal end;
a second poppet rod extending from the enlarged base opposite the proximal end; and
a distal end established by the second poppet rod opposite the proximal end.

17. The system of claim 16, further comprising:
a coil spring around the second poppet rod within the bushing.

18. The system of claim 13, wherein the solenoid valve includes a housing, the housing forming a supply port, a control port, and an exhaust port, the poppet being movable to block flow through one or more of the ports.

19. The system of claim 18, wherein the poppet is movable between a de-energized configuration wherein flow is prohibited between the control port and the exhaust port, and permitted between the control port and the supply port, plural partially energized configurations wherein flow is permitted between the supply port and the control port, between the control port and the exhaust port, and between the exhaust port and the supply port, and a fully energized configuration wherein flow is prohibited between the control port and the supply port and flow is permitted between the control port and the exhaust port.

* * * * *